United States Patent
Tsu (10) Patent No.: US 9,069,990 B2
(45) Date of Patent: Jun. 30, 2015

(54) SECURE INFORMATION STORAGE SYSTEM AND METHOD

(75) Inventor: William Tsu, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1236 days.

(21) Appl. No.: 11/998,256

(22) Filed: Nov. 28, 2007

(65) Prior Publication Data

US 2009/0136041 A1    May 28, 2009

(51) Int. Cl.
     *H04L 29/06*      (2006.01)
     *G06F 21/84*      (2013.01)

(52) U.S. Cl.
     CPC ....................................... *G06F 21/84* (2013.01)

(58) Field of Classification Search
     CPC ........................................................ G06F 21/84
     USPC ........................................................ 380/281
     See application file for complete search history.

(56) References Cited

U.S. PATENT DOCUMENTS

| | | | |
|---|---|---|---|
| 5,457,748 A | 10/1995 | Bergum et al. | |
| 6,073,244 A | 6/2000 | Iwazaki | |
| 6,760,441 B1 | 7/2004 | Ellison et al. | |
| 7,239,709 B1 | 7/2007 | Yamada et al. | |
| 7,278,016 B1 | 10/2007 | Detrick et al. | |
| 7,721,096 B2 | 5/2010 | Chiasson et al. | |
| 2001/0011347 A1 | 8/2001 | Narayanaswamy et al. | |
| 2002/0085721 A1 | 7/2002 | Saneto et al. | |
| 2003/0023822 A1 | 1/2003 | Scott et al. | |
| 2003/0056107 A1 | 3/2003 | Cammack et al. | |
| 2003/0084337 A1 | 5/2003 | Simionescu et al. | |
| 2003/0115471 A1 | 6/2003 | Skeba | |
| 2003/0177373 A1 | 9/2003 | Moyer et al. | |
| 2004/0039927 A1 | 2/2004 | Hazama et al. | |
| 2004/0080671 A1* | 4/2004 | Siemens et al. | 348/473 |
| 2004/0186991 A1* | 9/2004 | Kobayashi et al. | 713/153 |
| 2004/0193873 A1 | 9/2004 | England | |
| 2004/0225875 A1* | 11/2004 | Huang et al. | 713/1 |
| 2005/0111664 A1 | 5/2005 | Ritz et al. | |

(Continued)

FOREIGN PATENT DOCUMENTS

| | | |
|---|---|---|
| CN | 1421000 A | 5/2003 |
| EP | 0961193 | 12/1999 |

(Continued)

OTHER PUBLICATIONS

Machine Translation of English Abstract for Korean Patent Application No. 1020040044502; Filed Jun. 16, 2004.

(Continued)

*Primary Examiner* — Lisa Lewis (57) ABSTRACT

The present invention systems and methods facilitate secure communication of information between devices. A present invention system and method can enable secure communication of proprietary content in a HDCP compliant configuration. In one embodiment, a high definition content protection key secure management method is utilized to enable efficient and secure storage of a HDCP key. A high definition content protection key value is received. The high definition content protection key is encrypted utilizing a secure key value, wherein the secure key value is not accessible via an external port. In one exemplary implementation, the secure key is stored in fuses included in a processing unit. The results of said encrypting in a memory (e.g., a BIOS memory, flash memory, etc.).

20 Claims, 5 Drawing Sheets

(56) References Cited

U.S. PATENT DOCUMENTS

| | | |
|---|---|---|
| 2005/0114664 A1 | 5/2005 | Davin |
| 2005/0132229 A1 | 6/2005 | Zhang et al. |
| 2005/0138409 A1 | 6/2005 | Sheriff et al. |
| 2005/0283601 A1 | 12/2005 | Tahan |
| 2005/0289067 A1 | 12/2005 | Lampson et al. |
| 2006/0005237 A1 | 1/2006 | Kobata et al. |
| 2006/0090084 A1 | 4/2006 | Buer |
| 2006/0136748 A1 | 6/2006 | Bade et al. |
| 2006/0174109 A1 | 8/2006 | Flynn |
| 2006/0174240 A1 | 8/2006 | Flynn |
| 2006/0179302 A1 | 8/2006 | Hatakeyama |
| 2006/0179308 A1 | 8/2006 | Morgan et al. |
| 2006/0224878 A1 | 10/2006 | Datta et al. |
| 2006/0282901 A1* | 12/2006 | Li et al. .................. 726/26 |
| 2007/0022243 A1 | 1/2007 | Rudelic |
| 2007/0027988 A1 | 2/2007 | Lavin et al. |
| 2007/0055881 A1 | 3/2007 | Fuchs et al. |
| 2007/0074241 A1 | 3/2007 | Yeo |
| 2007/0083744 A1 | 4/2007 | Seok |
| 2007/0124409 A1 | 5/2007 | Sibert |
| 2007/0169098 A1 | 7/2007 | Kikuchi |
| 2007/0198851 A1 | 8/2007 | Goto |
| 2007/0217614 A1 | 9/2007 | Fujiwara et al. |
| 2007/0220242 A1 | 9/2007 | Suzuki et al. |
| 2007/0220500 A1 | 9/2007 | Saunier |
| 2007/0234130 A1 | 10/2007 | Sullivan et al. |
| 2007/0300207 A1 | 12/2007 | Booth et al. |
| 2008/0028235 A1 | 1/2008 | Smith et al. |
| 2008/0040598 A1 | 2/2008 | Lee et al. |
| 2008/0072333 A1* | 3/2008 | Chen .................. 726/27 |
| 2008/0077800 A1 | 3/2008 | Wang et al. |
| 2008/0077973 A1 | 3/2008 | Zimmer et al. |
| 2008/0082680 A1 | 4/2008 | Grewal et al. |
| 2008/0086630 A1 | 4/2008 | Rodgers et al. |
| 2008/0086652 A1 | 4/2008 | Krieger et al. |
| 2008/0114994 A1 | 5/2008 | Iyer et al. |
| 2008/0137848 A1 | 6/2008 | Kocher et al. |
| 2008/0165952 A1 | 7/2008 | Smith et al. |
| 2008/0256595 A1 | 10/2008 | Schunter et al. |
| 2008/0270805 A1* | 10/2008 | Kean .................. 713/189 |
| 2008/0282084 A1 | 11/2008 | Hatakeyama |
| 2009/0202069 A1 | 8/2009 | Cox et al. |
| 2010/0185845 A1 | 7/2010 | Takayama et al. |
| 2010/0189340 A1 | 7/2010 | Ueda |

FOREIGN PATENT DOCUMENTS

| | | |
|---|---|---|
| EP | 1845470 | 10/2007 |
| GB | 2427720 | 1/2007 |
| JP | 2004530235 A | 9/2004 |
| JP | 2005122733 A | 5/2005 |
| KR | 20050119416 | 12/2005 |
| TW | 200306107 | 11/2003 |
| WO | 0175563 A2 | 10/2001 |
| WO | WO02/21763 | 3/2002 |
| WO | 0237285 | 5/2002 |
| WO | WO2008/071572 | 6/2008 |

OTHER PUBLICATIONS

Yang Koshio, et al. Hardware-Dependent Software-Role of Firmware Study Bootloader from CPU Mechanism/Design of BIOS, Interface, Japan, CQ Publishing Co., Ltd., Jan. 1, 2008, vol. 34, No. 1, p. 95-104.

Yu Fajiang & Zhang Huanguo, Design and Implementation of a Bootstrap Trust Chain, Wuhan University Journal of Natural Sciences, 2006, pp. 1449-1452, vol. 11-No. 6, Article ID: 1007-1202 (2006) 06-1449-04, INSPEC association No. 9445762.

* cited by examiner

SECURE INFORMATION STORAGE SYSTEM AND METHOD

FIELD OF THE INVENTION

The present invention relates to the field of information security.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Electronic systems providing these advantageous results often include attempts at restricted or controlled presentation of proprietary information. However, controlling information presentation and effectively enforcing designated distribution conditions are often difficult and problematic.

One area of concern is proprietary information in the entertainment industry. Unprotected digital content can often be copied relatively easily without loss of quality. Traditional digital rights management attempt to enable authorized distribution of propriety content while preventing unauthorized utilization or copying. High bandwidth digital content protection (HDCP) is one exemplary digital rights management approach that has been developed to control access to content when it is distributed. HDCP is primarily directed at protecting content as it is communicated between devices, for example, communicated over a digital visual interface (DVI) or high definition multimedia interface (HDMI) connection (e.g., from a computer to a display monitor).

Conventionally, attempts at restricting distribution and/or presentation of information are often a relatively expensive, resource intensive activity that usually involves specialized components. Traditional HDCP protection approaches typically involve an encryption that utilizes a HDCP key. The HDCP standards dictate that the HDCP key be unique to each graphics processor and the key is not exposed to an end user of content protected by the key. One traditional approach for utilizing HDCP includes a dedicated secure read only memory (ROM) for storing the HDCP key. Dedicated secure ROMs consume precious board space and usually add more complexity and expense than other types of general unsecured memory types. However, information stored in unsecured memories is often subject to unauthorized interception.

SUMMARY

Present invention information securing systems and methods are described. In one embodiment, a secure system and method facilitates secure storage of a security key and secure encryption of information. The secure system and method can also enable secure communication of proprietary content in a HDCP compliant configuration. In one embodiment, a high definition content protection key secure management method is utilized to enable efficient and secure storage of a HDCP key. A high definition content protection key value is received. The high definition content protection key is encrypted utilizing a secure key value, wherein the secure key value is not accessible via an external port. In one exemplary implementation, the secure key is stored in fuses included in a processing unit. The results of the encrypting are stored in a memory (e.g., a BIOS memory, flash memory, etc.).

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

In one embodiment, the present invention contributes heightened security precautions for protecting information from unauthorized disclosure. In one exemplary implementation a secure key is utilized to encrypt information for storage or communication as secure information. The secure key is "loaded" under secure conditions and is not accessible through an external port of a device. The encryption utilizing the secure key provides protection from unauthorized access to the information. Embodiments of the present invention are readily adaptable to a variety of hierarchical levels of security.

Figure 1A:
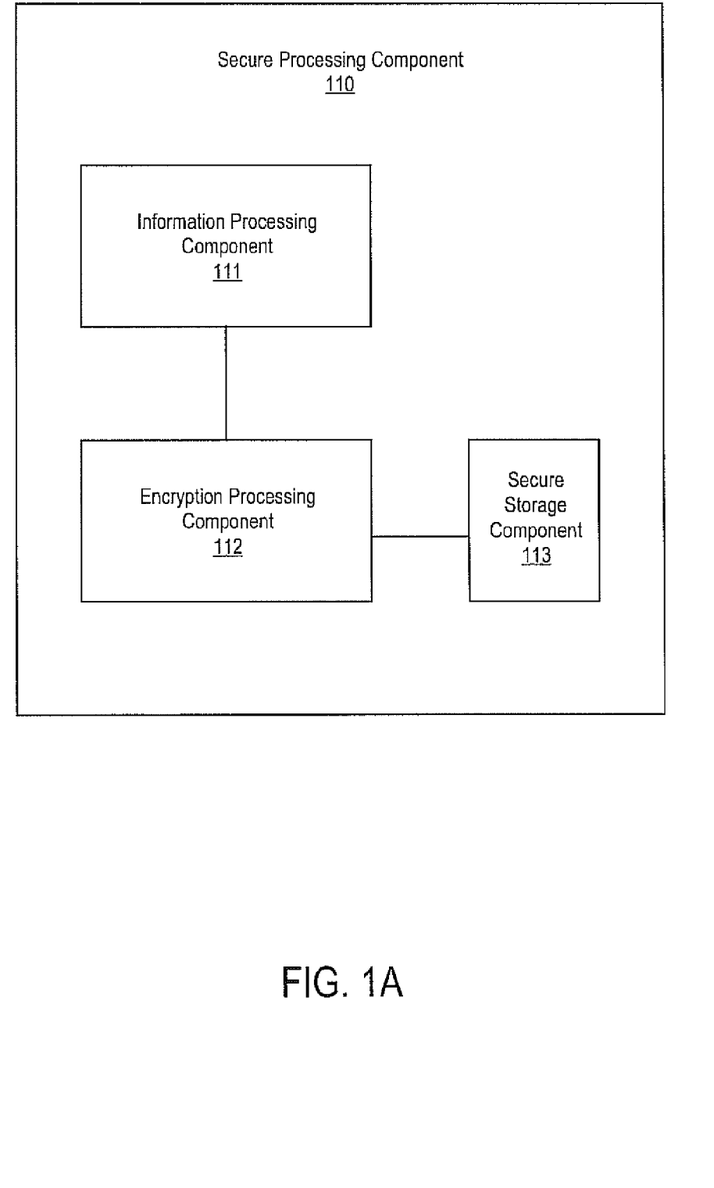
FIG. 1A is a block diagram of an exemplary secure processing unit in accordance with one embodiment of the present invention.

FIG. 1A is a block diagram of exemplary secure processing unit 110 in accordance with one embodiment of the present invention. Secure processing unit 110 includes an information processing component 111, encryption processing component 112 and secure storage component 113. Information processing component 111 is coupled to encryption processing component 112 which in turn is coupled to secure storage component 113.

The components of secure processing unit 110 cooperatively operate to secure information. Information processing component 111 performs unprotected information processing. Secure processing component 112 performs secure processing that secures the unencrypted information. The secure storage component 113 stores security control information that utilized by the secure processing component and is not accessible through external ports of the processor.

In one embodiment, the security control information is a secure key. The secure storage component includes programmed fuses that are utilized to store a secure key in one exemplary implementation. The secure key is not accessible to external ports and is utilized to encrypt a variety of unencrypted information. In one embodiment, the secure key is unique to the secure processing component. The secure key can be a private individual processing component identifier.

It is appreciated the secure key can be utilized in the encryption of data for a variety of use cases and can even be utilized encrypting different hierarchical levels of encryption information. In one embodiment a nomenclature distinction is made between different levels of hierarchical encryption. An encryption utilizing a secure key of the present invention (which is not accessible at an external communication port) is referred to as a secure encryption and the results are referred to as secure information. An encryption utilizing a protection key which may be accessible (either by legitimate means or nefarious means) is referred to as a protection encryption and the results referred to as protected information. The different nomenclature for purposes of associating different encryption operations with different levels of a hierarchical encryption architecture is for identification convenience. With respect to unauthorized access, information that is secure is also protected from unauthorized access and information that is protected is also secure from unauthorized access.

Figure 1B:
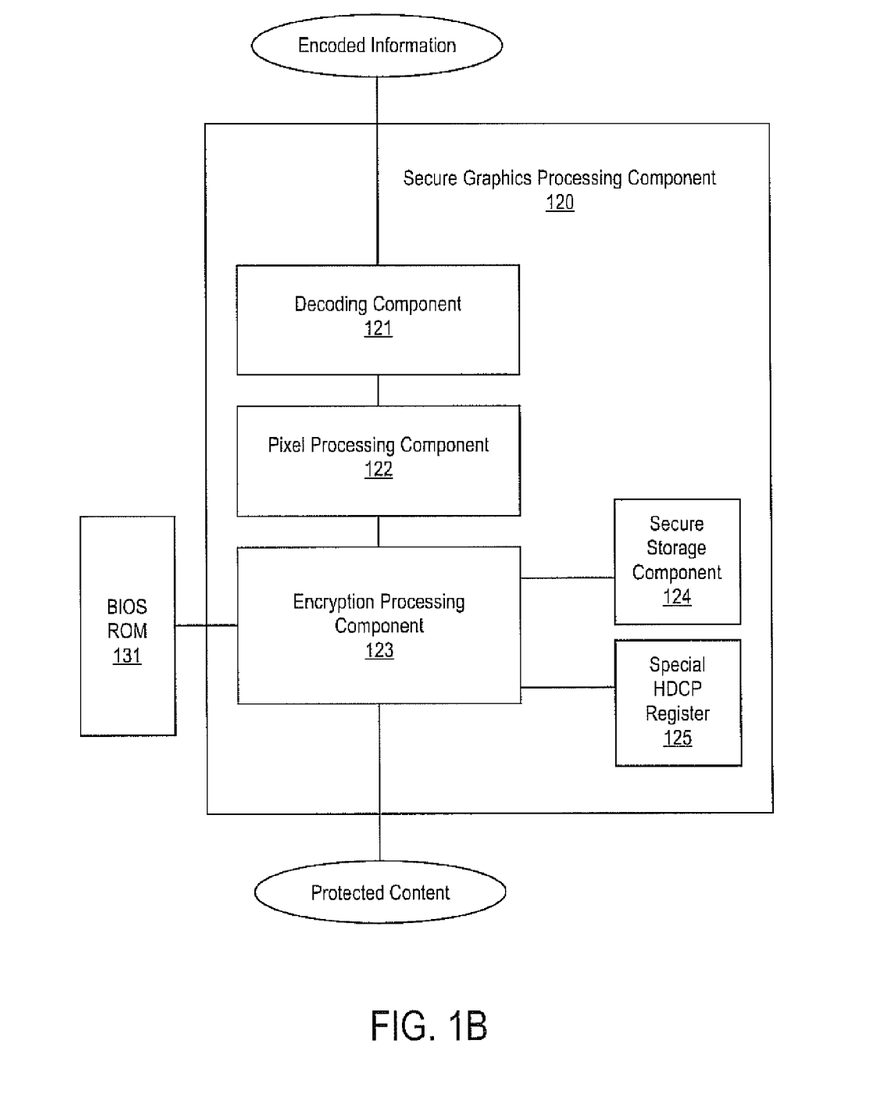
FIG. 1B is a block diagraph of an exemplary secure graphics processing unit in accordance with one embodiment of the present invention.

In one embodiment, a secure processing system is utilized to encrypt a HDCP key utilized in encrypting data for protected communication to other devices (e.g., a display monitor). FIG. 1B is a block diagram of exemplary secure graphics processing unit 120 in accordance with one embodiment of the present invention. Secure graphics processing unit 120 is similar to some implementations of secure processing unit 110. Secure processing unit 120 includes decoding component 121, pixel processing component 122, encryption processing component 123, secure storage component 124 and special HDCP register 125. Decoding component 121 is coupled to pixel processing component 122 which is coupled to encryption processing component 123. Encryption processing component 123 is coupled to secure storage component 124 and special HDCP register 125. Encryption processing component 123 is also coupled to BIOS ROM 131.

The components of secure graphics processing unit 120 cooperatively operate to process graphics information and securely encrypt the resulting information for communication in accordance with HDCP standards. Decoding component 121 receives encoded video information and decodes the information. It is appreciated the decoding can include decrypting. Pixel processing component 121 performs pixel processing (e.g., rasterizing, shading, texture adjustments, etc.) on the decrypted information. Secure processing component 123 performs a variety of security and protection related processing.

In one embodiment, secure processing component 123 retrieves a HDCP key that is pushed onto special HDCP register 125 in a secure environment. In one embodiment, the HDCP key is pushed onto special HDCP register 125 at a manufacturing facility under secured conditions (e.g., a testing stage). The secure storage component 124 stores a secure key or unique value (e.g., a private unique graphics unit identifier). In one exemplary implementation, the secure storage component 124 is a group of fuses configured (e.g., blown by a laser) in a pattern to coincide with the secure key unique value. The unique value is not available at the external ports of the graphics unit.

Secure processing component 123 utilizes the unique value from the secure storage component as a key to encrypt the HDCP key retrieved from the special HDCP register 125. The results are stored in BIOS ROM 131. Once encrypted and stored in the BIOS ROM 131 the HDCP key value can be removed from the special register 125. The results can be retrieved from BIOS ROM 131 and decrypted by encryption processing component 123 to obtain the unencrypted HDCP key. Secure processing component 123 can then utilize the retrieved HDCP key to encrypt proprietary information and forward the proprietary information in a protected format.

In one embodiment, the HDCP key can be forwarded to the secure graphics processing component 120 from a remote location that forwards HDCP keys. In one exemplary implementation, the HDCP key is encrypted using the secure key at a secure facility (e.g., the facility where the processing component was manufactured with the secure key pattern burned into fuses, producers main office, etc.) and communicated to the processor in the field. The secure key value implemented in the processor at manufacturing time can be utilized to decrypt the HDCP key communicated later over a network when the processor is in the field or with an end user. Since the HDCP key is encrypted with the secure key value and the secure key value is not accessible at an external port of the processor, an end user can not readily decrypt the information to ascertain the HDCP key. The high definition content protection (HDCP) key can also be received via a secure link (e.g., over a network).

Figure 2:
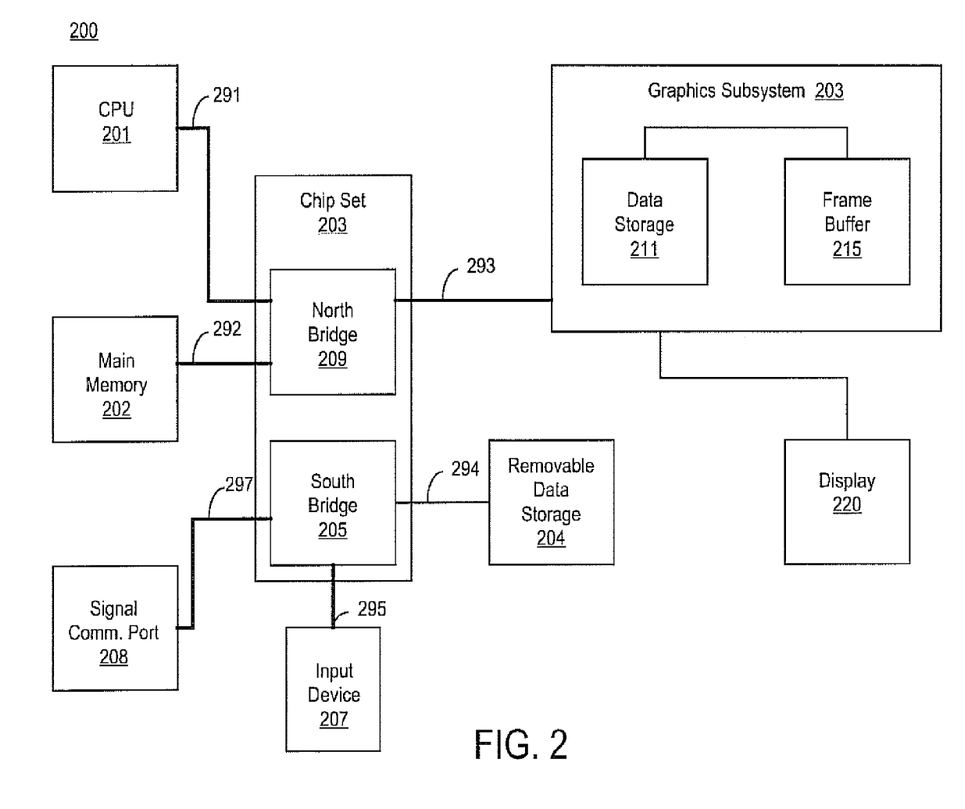
FIG. 2 is a block diagram of a computer system in which embodiments of the present invention can be implemented.

FIG. 2 is a block diagram of a computer system 200, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 292 (e.g., the Advanced Graphics Port interface) couples north bridge of chipset 203 to graphic subsystem 210. Communication buses 294-297 (e.g., a PCI bus) couple south bridge 205 of chip set 203 to removable data storage device 204, input device 207, signal communications port 208 respectively. Graphics subsystem 210 includes graphics processor 211 and graphics buffer 215.

The components of computer system 200 cooperatively operate to provide versatile functionality and performance. In one exemplary implementation, the components of computer system 200 cooperatively operate to provide predetermined types of functionality, even though some of the functional components included in computer system 200 may be defective. Communications bus 291, 292, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Graphics processor 211 processes graphics commands from central processor 201 and provides the resulting data to graphics buffers 215 for storage and retrieval by display monitor 220.

In one embodiment, a graphics processor 211 is similar to secure graphics processing unit 120 and graphics subsystem 110 includes a BIOS ROM memory. In one exemplary implementation, graphics processor 211 utilizes a secure key stored in a secure memory (e.g., fuses in graphics processor 211) to encrypt a HDCP key and the encrypted HDCP key results are stored in the BIOS ROM. When graphics subsystem 210 is going to forward information to display monitor, graphics processor 211 retrieves the encrypted HDCP key value from the BIOS ROM, decrypts the HDSCP key and utilizes the decrypted HDCP key value to encrypt the information being forwarded to the display.

It is appreciated that the present invention can be implemented in a variety of embodiments. In one exemplary implementation the present invention can be utilized in processing systems utilized to provide a variety of graphics applications including video games. For example, the present invention can be utilized to disable defective components in a game console, personal computer, personal digital assistant, cell phone or any number of platforms for implementing a video game. It is also appreciated that references to video game application implementations are exemplary and the present invention is not limited to these implementations.

Figure 3:
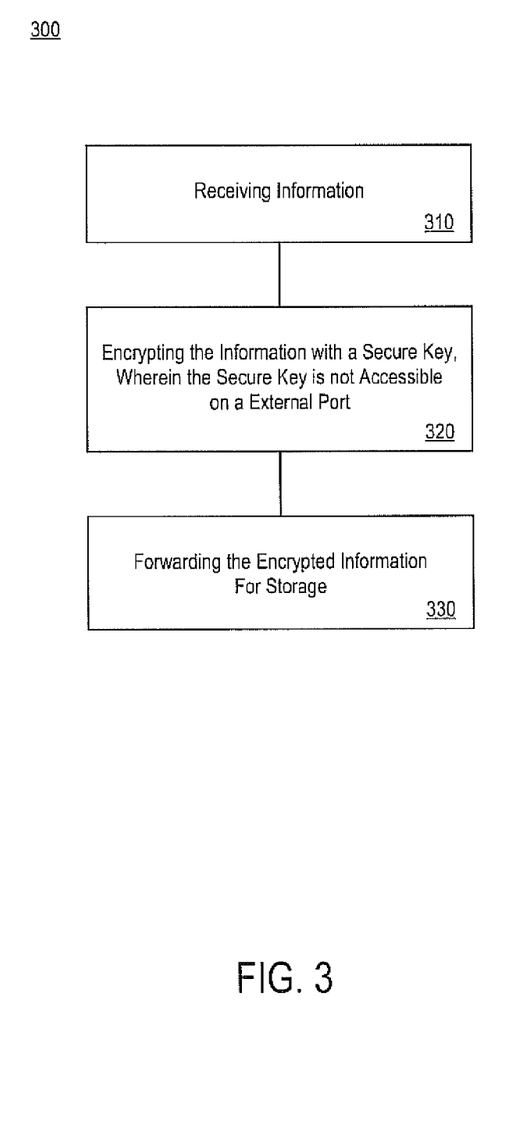
FIG. 3 is a block diagram of an exemplary information securing method in accordance with one embodiment of the present invention.

FIG. 3 is a block diagram of exemplary information securing method 300 in accordance with one embodiment of the present invention. Securing method 300 facilitates securing information processed by a processor. The securing method relies upon encryption with a secure key that is introduced to the processor in a secure environment and is not accessible at an external port of the processor.

In block 310, information is received. In one embodiment the information is received by a processing component (e.g., a CPU, a GPU, an integrated CPU, etc.). The received information can itself be a different level encryption key. For example, the received information can include a HDCP key.

In block 320, the information is encrypted with a secure key that is not accessible on an external port. In one embodiment, the secure key value is burned in fuses of a processing unit. In one exemplary implementation the secure value is unique to the processing chip.

In block 330 the encrypted information is forwarded for storage. In one embodiment the encrypted information is forwarded to a general memory.

It is appreciated that secure methods of the present invention can be utilized to secure various different information for a variety of different use cases.

Figure 4:
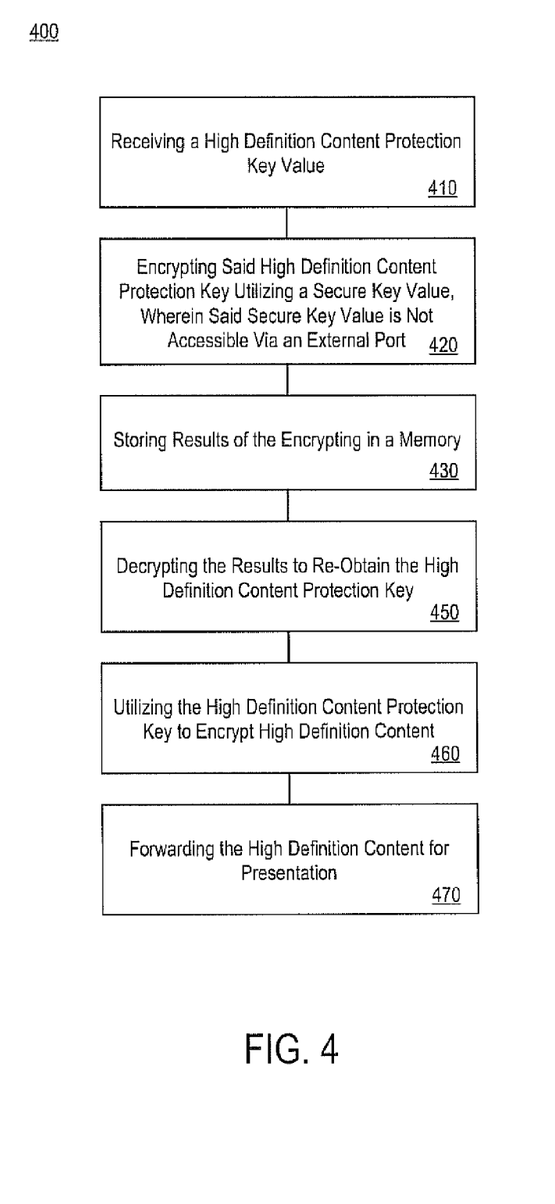
FIG. 4 is a block diagram of exemplary high definition content protection key secure management method in accordance with one embodiment of the present invention.

FIG. 4 is a block diagram of exemplary high definition content protection key secure management method 400 in accordance with one embodiment of the present invention. High definition content protection key secure management method 400 facilitates secure handling of HDCP keys without the need for special dedicated secure memory.

In block 410, a high definition content protection key value is received. In one embodiment, the secure key is unique and is stored in a secure location that is not accessible via an external port. In one embodiment, the secure key is retrieved from fuses and confined to buses and operations that are not accessible at external ports.

In block 420, the high definition content protection key is encrypted utilizing a secure key value. In one embodiment, both the secure key is unique to a graphics processor and the high definition protection key is unique to the graphics processor.

In block 430, the results of the encrypting (e.g., a HDCP key value that is itself encrypted) are stored in a memory. It is appreciated the memory can include various different types of memory including a BIOS ROM memory, a flash memory, etc. In one exemplary implementation, the memory is not a dedicated secure memory and the HDCP key value is secure even if it is nefariously intercepted since the intercepted value is an encrypted version.

In block 440, the results are retrieved from the memory. In one embodiment, the encrypted HDCP key value is retrieved from the memory and forwarded to an encryption/decryption processing component.

In block 450, the results are decrypted to re-obtain the high definition content protection key. The unencrypted high definition content protection key value is also not available at an external port. In one exemplary implementation, the unencrypted high definition content protection key is limited to operations within an encryption component.

In block 460, the high definition content protection key is utilized to encrypt high definition content. The encrypted high definition content is protected from useful or understandable access by unauthorized devices that do not have the corresponding appropriate HDCP key to decrypt the information since the devices would not be able to readily decrypt the high definition content.

In block 470, the encrypted or protected high definition content is forwarded. In one embodiment, the encrypted high definition content is forwarded to a display with a corresponding HDCP key for decryption and presentation.

Thus, the present invention facilitates protection of information in a convenient and effective manner. The present security techniques can be utilized in a variety of applications including HDCP compatible applications. In one embodiment, the present security techniques enable secure storage of a HDCP key in an ordinary memory without utilizing a dedicated secure ROM.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A high definition content protection key secure management method comprising:
    receiving a high definition content protection key value, wherein said high definition content protection key is pushed onto a high definition content protection register in a secure environment;
    encrypting said high definition content protection key utilizing a secure key value unique to a particular device, wherein said secure key value and said high definition content protection key are not accessible via an external port;
    storing results of said encrypting in a memory;
    retrieving said results from said memory;
    decrypting said results to re-obtain said high definition content protection key;
    utilizing said high definition content protection key to encrypt high definition content; and
    forwarding results of said high definition content encryption.

2. A high definition content protection key secure management method of claim 1 wherein said secure key value is burned in fuses of a processor.

3. A high definition content protection key secure management method of claim 1 wherein said memory is a BIOS ROM memory.

4. A high definition content protection key secure management method of claim 1 wherein said memory is a flash memory.

5. A high definition content protection key secure management method of claim 1 wherein said secure key is unique to a graphics processor and said high definition protection key is unique to said graphics processor.

6. A processing unit comprising:
    an information processing component for performing unencrypted information processing;
    a secure processing component for securing said unencrypted information; and
    a secure storage component in said processing unit, said secure storage component for storing security control information that is utilized by said secure processing component, wherein said security control information includes a secure key value and a high definition content protection key that are not accessible through external ports of said processor, wherein said secure key value is a key used to encrypt the high definition content protection key, and is unique to said processing unit.

7. A processing unit of claim 6 wherein said secure storage component includes programmed fuses.

8. A processing unit of claim 6 wherein said processing unit is a graphics processing unit.

9. A processing unit of claim 8 further comprising a decoding processing component for decoding incoming information.

10. A processing unit of claim 9 wherein said information processing component includes a pixel processing component.

11. A processing unit of claim 8 wherein said secure processing component generates a secure version of a high definition content protection key.

12. A processing unit of claim 11 wherein said security control information is a secure key and said secure processing component utilizes said secure key to encrypt said high definition content protection key.

13. A processing unit of claim 11 said high definition content protection key is encrypted utilizing said secure key and is received via a network.

14. A processing unit of claim 6 wherein said secure storage component includes a register.

15. An information securing method comprising:
    receiving information;
    encrypting said information utilizing a secure key unique to a particular processing device, wherein said secure key and said information are not accessible on an external port; and
    forwarding said encrypted information to a secure storage component in said processing device for storage, said secure storage component for storing security control information that is utilized by said processing device, wherein said security control information includes a secure key value and said information that are not accessible through said external ports of said processing device.

16. An information securing method of claim 15 wherein said secure key value is burned in fuses of said processing device.

17. An information securing method of claim 15 wherein said encrypted information is forwarded to a general memory.

18. An information securing method of claim 15 wherein said received information is itself a different level encryption key.

19. An information securing method of claim 15 wherein said information is a high definition content protection key.

20. An information securing method of claim 15 wherein said secure storage component is a register.

* * * * *